United States Patent
Chorvath et al.

(10) Patent No.: US 6,713,569 B2
(45) Date of Patent: *Mar. 30, 2004

(54) THERMOPLASTIC SILICONE ELASTOMERS FORMED FROM NYLON RESINS

(75) Inventors: Igor Chorvath, Midland, MI (US); Frances Marie Fournier, Flint, MI (US); Michael Kang-Jen Lee, Midland, MI (US); Dawei Li, Midland, MI (US); Robert Leo Oldinski, Bay City, MI (US); Richard Leroy Rabe, Midland, MI (US); Jeffrey Paul Sage, Midland, MI (US); Dean Curtis Gray, Midland, MI (US); Yongjun Lee, Kanagawa (JP); Koji Nakanishi, Chiba (JP)

(73) Assignee: Dow Corning Corporation, Midland, MI (US)

( * ) Notice: Subject to any disclaimer, the term of this patent is extended or adjusted under 35 U.S.C. 154(b) by 12 days.

This patent is subject to a terminal disclaimer.

(21) Appl. No.: 10/015,155

(22) Filed: Oct. 26, 2001

(65) Prior Publication Data

US 2002/0086937 A1 Jul. 4, 2002

Related U.S. Application Data

(63) Continuation-in-part of application No. 09/535,556, filed on Mar. 27, 2000, now Pat. No. 6,362,287.

(51) Int. Cl.$^7$ .................................................. C08K 5/13
(52) U.S. Cl. ................ 525/431; 525/903; 524/741; 524/740; 524/736; 524/721; 524/714; 524/862
(58) Field of Search ..................... 525/431, 903; 524/740, 741, 736, 721, 714, 862

(56) References Cited

U.S. PATENT DOCUMENTS

| | | | |
|---|---|---|---|
| 4,500,688 A | 2/1985 | Arkles | 525/431 |
| 4,695,602 A | 9/1987 | Crosby et al. | 524/439 |
| 4,714,739 A | 12/1987 | Arkles | 525/92 |
| 4,803,244 A | 2/1989 | Umpleby | 525/105 |
| 4,831,071 A | 5/1989 | Ward et al. | 524/401 |
| 4,849,469 A | 7/1989 | Crosby et al. | 524/439 |
| 4,970,263 A | 11/1990 | Arkles et al. | 525/92 |
| 5,391,594 A | 2/1995 | Romenesko et al. | 523/212 |
| 5,648,426 A | 7/1997 | Zolotnitsky | 525/100 |
| 6,013,715 A | 1/2000 | Gornowicz et al. | 524/492 |
| 6,281,286 B1 * | 8/2001 | Chorvath et al. | 524/862 |
| 6,362,287 B1 * | 3/2002 | Chorvath et al. | 525/431 |
| 6,362,288 B1 * | 3/2002 | Brewer et al. | 525/431 |

FOREIGN PATENT DOCUMENTS

| | | |
|---|---|---|
| EP | 0 651 009 A1 | 5/1995 |
| JP | 62-11897 | 1/1987 |
| JP | 07-26147 | 1/1995 |
| WO | WO 96/01291 | 1/1996 |

* cited by examiner

Primary Examiner—Margaret G. Moore
(74) Attorney, Agent, or Firm—Alan Zombeck

(57) ABSTRACT

A method for preparing a thermoplastic elastomer is disclosed, said method comprising (I) mixing (A) a rheologically stable polyamide resin having a melting point or glass transition temperature of 25° C. to 275° C., (B) a silicone base comprising
  (B') 100 parts by weight of a diorganopolysiloxane gum having a plasticity of at least 30 and having an average of at least 2 alkenyl radicals in its molecule and
  (B") 5 to 200 parts by weight of a reinforcing filler,
the weight ratio of said silicone base to said polyamide resin is from 35:65 to 85:15, (C) 0.01 to 5 parts by weight of a stabilizer per 100 parts by weight of said polyamide resin plus said silicone base, said stabilizer being selected from hindered phenols; thioesters; hindered amines; 2,2'-(1,4-phenylene) bis(4H-3,1-benzoxazin-4-one); and 3,5-di-tert-butyl-4-hydroxybenzoic acid, hexadecyl ester, (D) an organohydrido silicon compound which contains an average of at least 2 silicon-bonded hydrogen groups in its molecule and (E) a hydrosilation catalyst, components (D) and (E) being present in an amount sufficient to cure said diorganopolysiloxane (B'); and (II) dynamically curing said diorganopolysiloxane (B'), wherein at least one property of the thermoplastic elastomer selected from tensile strength or elongation is at least 25% greater than the respective property for a corresponding simple blend wherein said diorganopolysiloxane is not cured and said thermoplastic elastomer has an elongation of at least 25%.

24 Claims, No Drawings

THERMOPLASTIC SILICONE ELASTOMERS FORMED FROM NYLON RESINS

This application is a continuation in part of U.S. patent application Ser. No. 09/535,556, filed Mar. 27, 2000 now U.S. Pat. No. 6,362,287.

FIELD OF THE INVENTION

The present invention relates to a thermoplastic elastomer composition wherein a silicone base and a stabilizer are blended with a polyamide resin and a silicone gum contained in the base is dynamically vulcanized in the mixture.

BACKGROUND OF THE INVENTION

Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV).

Arkles, in U.S. Pat. No. 4,500,688, discloses semi-interpenetrating networks (IPN) wherein a vinyl-containing silicone fluid having a viscosity of 500 to 100,000 cS is dispersed in a conventional thermoplastic resin. Arkles only illustrates these IPNs at relatively low levels of silicone. The vinyl-containing silicone is vulcanized in the thermoplastic during melt mixing according to a chain extension or crosslinking mechanism which employs a silicon hydride-containing silicone component. This disclosure states that the chain extension procedure results in a thermoplastic composition when the vinyl-containing silicone has 2 to 4 vinyl groups and the hydride-containing silicone has 1 to 2 times the equivalent of the vinyl functionality. On the other hand, silicones which predominantly undergo crosslinking reaction result in thermoset compositions when the vinyl-containing silicone has 2 to 30 vinyl groups and the hydride-containing silicone has 2 to 10 times the equivalent of the vinyl functionality. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions or to the specific nature of the organic resin.

Publication WO 96/01291 to Advanced Elastomer Systems discloses thermoplastic elastomers having improved resistance to oil and compression set. These systems are prepared by first forming a cured rubber concentrate wherein a curable elastomeric copolymer is dispersed in a polymeric carrier not miscible therewith, the curable copolymer being dynamically vulcanized while this combination is mixed. The resulting rubber concentrate is, in turn, blended with an engineering thermoplastic to provide the desired TPE. Silicone rubber is disclosed as a possible elastomeric component, but no examples utilizing such a silicone are provided. Further, this publication specifically teaches that the polymeric carrier must not react with the cure agent for the curable copolymer.

Crosby et al. in U.S. Pat. No. 4,695,602 teach composites wherein a silicone semi-IPN vulcanized via a hydrosilation reaction is dispersed in a fiber-reinforced thermoplastic resin having a high flexural modulus. The silicones employed are of the type taught by Arkles, cited supra, and the composites are said to exhibit improved shrinkage and warpage characteristics relative to systems which omit the IPN.

Ward et al., in U.S. Pat. No. 4,831,071, disclose a method for improving the melt integrity and strength of a high modulus thermoplastic resin to provide smooth-surfaced, high tolerance profiles when the modified resin is melt-drawn. As in the case of the disclosures to Arkles et al., cited supra, a silicone mixture is cured via a hydrosilation reaction after being dispersed in the resin to form a semi-IPN, and the resulting composition is subsequently extruded and melt-drawn.

U.S. Pat. No. 6,013,715 to Gornowicz et al. teaches the preparation of TPSiV elastomers wherein a silicone gum (or filled silicone gum) is dispersed in either a polyolefin or a poly(butylene terephthalate) resins and the gum is subsequently dynamically vulcanized therein via a hydrosilation cure system. The resulting elastomers exhibit an ultimate elongation at break of at least 25% and have significantly improved mechanical properties over the corresponding simple blends of resin and silicone gum in which the gum is not cured (i.e., physical blends). This is, of course, of great commercial significance since the vulcanization procedure, and the cure agents required therefor, add to both the complexity as well as the expense of the preparation and vulcanization would be avoided in many applications if essentially identical mechanical properties could be obtained without its employ.

In a copending application (Ser. No. 09/393,029 filed on Sep. 9, 1999) we disclose that the impact resistance of polyester and polyamide resins can be greatly augmented by preparing a thermoplastic silicone vulcanizate therefrom wherein the elastomeric component is a silicone rubber base which comprises a silicone gum and a silica filler and the weight ratio of the base to the resin ranges from 10:90 to 35:65. Although the resulting thermoplastic materials have improved impact resistance, they do not exhibit sufficiently low modulus to be useful as elastomers.

SUMMARY OF THE INVENTION

It has now been discovered that TPSiV elastomers of the type described in above cited U.S. Pat. No. 6,013,715 can be prepared from certain polyamide resins wherein the silicone component is a base comprising a diorganopolysiloxane gum and a reinforcing filler. As in the case of the teachings of U.S. Pat. No. 6,013,715, the elastomers disclosed herein generally also have good appearance, have an elongation of at least 25% and have a tensile strength and/or elongation at least 25% greater than that of the corresponding simple (physical) blend wherein the diorganopolysiloxane is not cured. However, it has been surprisingly found that such properties are significantly enhanced when a stabilizer is incorporated in the formulation. Moreover, inclusion of the stabilizer apparently also results in a lower melt viscosity of the instant thermoplastic elastomer vulcanizates, as reflected by process torque measurements during mixing. This reduction is of considerable value to fabricators since the elastomers of the present invention can be more readily processed in conventional equipment (e.g., extruders, injection molders) and results in lower energy consumption. Furthermore, unlike the teachings of Arkles, cited supra, and others, the silicone component which is dispersed in the thermoplastic resin, and dynamically cured therein, must include a high molecular weight gum, rather than a low viscosity silicone fluid, the latter resulting in compositions having poor uniformity.

The present invention, therefore, relates to a thermoplastic elastomer prepared by (I) mixing
 (A) a rheologically stable polyamide resin having a melting point or glass transition temperature of 25° C. to 275° C.,
 (B) a silicone base comprising
  (B') 100 parts by weight of a diorganopolysiloxane gum having a plasticity of at least 30 and having an average of at least 2 alkenyl groups in its molecule and
  (B") 5 to 200 parts by weight of a reinforcing filler, the weight ratio of said silicone base to said polyamide resin is from 35:65 to 85:15,
 (C) 0.01 to 5 parts by weight of a stabilizer per 100 parts by weight of said polyamide resin plus said silicone base, said stabilizer being selected from hindered phenols; thioesters; hindered amines; 2,2'-(1,4-phenylene) bis(4H-3, 1-benzoxazin-4-one); and 3,5-di-tert-butyl-4-hydroxybenzoic acid., hexadecyl ester,
 (D) an organohydrido silicon compound which contains an average of at least 2 silicon-bonded hydrogen groups in its molecule and
 (E) a hydrosilation catalyst, components (D) and (E) being present in an amount sufficient to cure said diorganopolysiloxane (B'); and
(II) dynamically curing said diorganopolysiloxane (B'), wherein said thermoplastic elastomer has an elongation of at least 25%.

The invention further relates to a thermoplastic elastomer which is prepared by the above method.

DETAILED DESCRIPTION OF THE INVENTION

Component (A) of the present invention is a thermoplastic polyamide resin. These resins are well known by the generic term "nylon" and are long chain synthetic polymers containing amide (i.e., —C(O)—NH—) linkages along the main polymer chain. For the purposes of the present invention, the polyamide resin has a melt point (m.p.) or glass transition temperature ($T_g$) of room temperature (i.e., 25° C.) to 275° C. Attempts to prepare TPSiV elastomers from polyamides having higher melt points (e.g., nylon 4/6) resulted in poor physical properties, the ultimate elongation of such products being less than the required 25% according to the present invention. Preferably the polyamide resin is dried first by passing a dry, inert gas cover resin pellets or powder at elevated temperatures. The degree of drying consistent with acceptable properties and processing depends on the particular polyamide and its value is generally recommended by the manufacturer or may be determined by a few simple experiments. It is generally preferred that the polyamide resin contains no more than about 0.1 weight percent of moisture. Finally, the polyamide must also be rheologically stable under the mixing conditions required to prepare the TPSiV elastomer, as described infra. This stability is evaluated on the neat resin at the appropriate processing temperature and a change of more than 20% in melt viscosity (mixing torque) within the time generally required to prepare the corresponding TPSiVs (e.g., 10 to 30 minutes in a bowl mixer) indicates that the resin is outside the scope of the present invention. Thus, for example, a dried nylon 11 sample having a m.p. of 198° C. was mixed in a bowl mixer under a nitrogen gas purge at about 210 to 220° C. for about 15 minutes and the observed mixing torque increased by approximately 200%. Such a polyamide resin is not a suitable candidate for the instant method.

Other than the above mentioned limitations, resin (A) can be any thermoplastic crystalline or amorphous high molecular weight solid homopolymer, copolymer or terpolymer having recurring amide units within the polymer chain. In copolymer and terpolymer systems, more than 50 mole percent of the repeat units are amide-containing units. Examples of suitable polyamides are polylactams such as nylon 6, polyenantholactam (nylon 7), polycapryllactam (nylon 8), polylauryllactam (nylon 12), and the like; homopolymers of aminoacids such as polypyrrolidinone (nylon 4); copolyamides of dicarboxylic acid and diamine such as nylon 6/6, polyhexamethyleneazelamide (nylon 6/9), polyhexamethylene-sebacamide (nylon 6/10), polyhexamethyleneisophthalamide (nylon 6,I), polyhexamethylenedodecanoic acid (nylon 6/12) and the like; aromatic and partially aromatic polyamides; copolyamides such as copolymers of caprolactam and hexamethyleneadipamide (nylon 6/6,6), or a terpolyamide, e.g. nylon 6/6,6/6,10; block copolymers such as polyether polyamides; or mixtures thereof. Preferred polyamide resins are nylon 6, nylon 12, nylon 6/12 and nylon 6/6.

It is also contemplated that component (A) can be blended with a non-polyamide, saturated thermoplastic resin such that the polyamide resin (A) comprises more than 50 percent of the blend volume. Preferably, this optional resin should have a glass transition temperature of 25° C. to 275° C.

Silicone base (B) is a uniform blend of a diorganopolysiloxane gum (B') a reinforcing filler (B").

Diorganopolysiloxane (B') is a high consistency (gum) polymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, or course, that these groups are selected such that the diorganopolysiloxane gum (B') has a glass temperature (or melt point) which is below room temperature and the gum is therefore elastomeric. Methyl preferably makes up at least 50, more preferably at least 90, mole percent of the non-unsaturated silicon-bonded organic groups in component (B').

Thus, polydiorganosiloxane (B') can be a homopolymer or a copolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B') include: trimethylsiloxy-endblocked dimethylsiloxane-methylhexenylsiloxane copolymers; dimethylhexenylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B') may also consist of combinations of two or more organopolysiloxanes. Most preferably, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C. When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the blends are weak and friable. The gums of the present invention are considerably more viscose than the silicone fluids employed in the prior art. For example, silicones contemplated by Arkles, cited supra, have an upper viscosity limit of 100,000 cS (0.1 m$^2$/s) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Component (B") is a finely divided filler which is known to reinforce diorganopolysiloxane (B') and is preferably selected from finely divided, heat stable minerals such as fumed and precipitated forms of silica, silica aerogels and titanium dioxide having a specific surface area of at least about 50 m$^2$/gram. The fumed form of silica is a preferred reinforcing filler based on its high surface area, which can be up to 450 m$^2$/gram and a fumed silica having a surface area of 50 to 400 m$^2$/g, most preferably 200 to 380 m$^2$/g, is highly preferred. Preferably, the fumed silica filler is treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10 and it is used at a level of about 5 to 50 parts by weight for each 100 parts by weight of the silica filler. When component (B') is the preferred vinyl-functional or hexenyl-functional polydimethylsiloxane, this treating agent is preferably a hydroxy-terminated polydimethylsiloxane.

For the purposes of the present invention, 5 to 200 parts by weight, preferably 5 to 150 and most preferably 20 to 100 parts by weight, of the reinforcing filler (B") are uniformly blended with 100 parts by weight of gum (B') to prepare silicone base (B). This blending is typically carried out at room temperature using a two-roll mill, internal mixer or other suitable device, as well known in the silicone rubber art. Alternatively, the silicone base can be formed in-situ during mixing prior to dynamic vulcanization of the gum, as further described infra. In the latter case, the temperature of mixing is kept below the softening point or melting point of the polyamide resin until the reinforcing filler is well dispersed in the diorganopolysiloxane gum.

Component (C) is a stabilizer. Stabilizer (C) is at least one organic compound selected from hindered phenols; thioesters; hindered amines; 2,2'-(1,4-phenylene)bis(4H-3,1-benzoxazin-4-one); or 3,5-di-tert-butyl-4-hydroxybenzoic acid, hexadecyl ester.

For the purposes of the present invention, a hindered phenol is an organic compound having at least one group of the formula

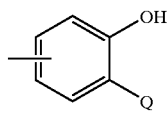

(i)

in its molecule, wherein Q is a monovalent organic group having 1 to 24 carbon atoms selected from hydrocarbon groups, hydrocarbon groups which optionally contain heteroatoms selected from sulfur, nitrogen or oxygen or halogen-substituted versions of the aforementioned groups. Examples of Q include groups such as alkyl, aryl, alkylaryl, arylalkyl, cycloalkyl and halogen-substituted version thereof; alkoxy groups having 1 to 24 carbon atoms, such as methoxy or t-butoxy; and hydrocarbon groups having 2 to 24 carbon atoms which contain heteroatoms (e.g., —CH$_2$—S—R", —CH$_2$—O—R" or —CH$_2$—C(O)OR", wherein R" is a hydrocarbon group having 1 to 18 carbon atoms). Further, although not explicitly shown in formula (i), it is also contemplated that the benzene ring may additionally be substituted with one or more of the above described Q groups. The residue of the organic compound to which group (i) is chemically bonded is not critical as long as it does not contain moieties which would interfere with the dynamic vulcanization, described infra. For example, this residue may be a hydrocarbon, a substituted hydrocarbon or a hetero atom-containing hydrocarbon group of the appropriate valence. It is also contemplated that the group according to formula (i) can be attached to hydrogen to form an organophenol. Preferably, the hindered phenol compound has a number average molecular weight of less than about 3,000.

A preferred hindered phenol compound contains at least one group of the formula

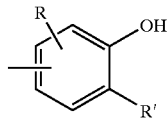

(ii)

in its molecule wherein the benzene ring may be optionally further substituted with hydrocarbon groups having 1 to 24 carbon atoms. In formula (ii), R is an alkyl group having one to four carbon atoms and R' is a hydrocarbon group having 4 to 8 carbon atoms.

Preferably, one to four of the groups shown in structures (i) or (ii) are attached to an organic residue of appropriate valence such that the contemplated compound has a molecular weight (MW) of less than about 1,500. Most preferably, four such groups are present in component (C) and this compound has a molecular weight of less than about 1,200. This monovalent (or polyvalent) organic residue can contain one or more heteroatoms such as oxygen, nitrogen, phosphorous and sulfur. The R' groups in the above formula may be illustrated by t-butyl, n-pentyl, butenyl, hexenyl, cyclopentyl, cyclohexyl and phenyl. It is preferred that both R and R' are t-butyl. For the purposes of the present invention, a group according to formula (ii) can also be attached to hydrogen to form a diorganophenol.

Non-limiting specific examples of suitable hindered phenols include 1,1,3-Tris(2'-methyl-4'-hydroxy-5'-t-butylphenyl)butane, N,N'-hexamethylene bis(3-(3,5-di-t-butyl-4-hydroxyphenyl)propionamide), 4,4'-thiobis(2-t-butyl-5-methylphenol), 1,3,5-tris(4-tert-butyl-3-hydroxy-2,6-dimethyl benzyl)-1,3,5-triazine-2,4,6-(1H,3H,5H)-trione, N,N'-hexamethylenebis(3,5-di-tert-butyl-4-hydroxyhydrocinnamamide), tetrakis(methylene(3,5-di-tert-butyl-4-hydroxy-hydrocinnamate))methane, 1,3,5-trimethyl-2,4,6-tris(3,5-di-tert-butyl-4-hydroxybenzyl)benzene, 4,4'-methylenebis(2,6-di-tertiary-butylphenol), 2,2'-thiobis(6-tert-butyl-4-methylphenol), 2,2'-thiobis(4-octylphenol), 4,4'-thiobis(6-tert-butyl-2-methylphenol), 4,4'-thiobis(3,6-di-sec-amylphenol), 2-(4,6-bis(2,4-dimethylphenyl)-1,3,5,-triazin-2-yl)-5-(octyloxy)phenol, 2,4-bisoctylmercapto-6-(3,5-di-tert-butyl-4-hydroxyanilino)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate, 1,3,5-tris(4-tert-butyl-3-hydroxy-2,6-dimethylbenzyl) isocyanurate, 2,6-di-tert-butyl-4-methoxyphenol, 2,5-di-tert-butylhydroquinone, 2,5-di-tert-amylhydroquinone, 2,6-di-tert-butylhydroquinone, 2,5-di-tert-butyl-4-hydroxyanisole, 2,6-diphenyl-4-octadecyloxyphenol, 3,5-di-tert-butyl-4-hydroxyanisole, 3,5-di-tert-butyl-4-hydroxyphenyl stearate, bis(3,5-di-tert-butyl-4-hydroxyphenyl)adipate, esters of beta-(3,5-di-tert-butyl-4-hydroxyphenyl)propionic acid with mono- or polyhydric alcohols (e.g., methanol, ethanol, n-octanol, trimethylhexanediol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylolpropane, tris(hydroxyethyl)isocyanurate, N,N'-bis(hydroxyethyl)oxalamide, 3-thiaundecanol, 3-thiapentadecanol, 4-hydroxymethyl-1-phospha-2,6,7-trioxabicyclo(2.2.2)octane and esters of beta-(5-tert-butyl-4-hydroxy-3-methylphenyl)propionic acid with mono- or polyhydric alcohols (as above).

Thioesters of the invention are compounds having at least one group of the formula

 (iii)

wherein G is —CH$_2$—CH$_2$—C(O)OR'''

R''' is a monovalent hydrocarbon group having 1 to 24 carbon atoms. Specific non-limiting examples of suitable thioesters include distearyl 3,3'-thiodipropionate, dilauryl-3,3'-thiodipropionate and di(tridecyl)3,3'-thiodipropionate.

The hindered amine of the present invention is a low molecular weight organic compound or a polymer which contains at least one divalent group of the formula

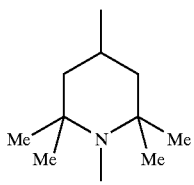

(iv)

wherein Me hereinafter denotes a methyl group. The backbone of this component is not critical as long as it does not contain functionality which would interfere with the dynamic vulcanization of the silicone gum and it may be illustrated by low-molecular and polymeric polyalkylpiperidines, as disclosed in U.S. Pat. No. 4,692,486, hereby incorporated by reference. Preferably, the above group has the structure

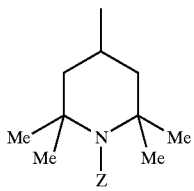

(v)

wherein Z is selected from hydrogen or an alkyl group having 1 to 24 carbon atoms, preferably hydrogen.

Specific non-limiting examples of suitable hindered amines include: 1,6-hexanediamine, N,N'-bis(2,2,6,6-pentamethyl-4-piperidinyl)-, polymers with morpholine-2,4,6-trichloro-1,3,5-triazine; 1,6-hexanediamine, N,N'-bis(2,2,6,6-tetramethyl-4-piperidinyl)-, polymers with 2,4,-Dichloro-6-(4-morpholiinyl)-1,3,5-triazine; bis(1,2,2,6,6-pentamethyl-4-piperidinyl)sebacate; bis(2,2,6,6-tetramethyl-4-piperidinyl)sebacate; dimethyl succinate polymer with 4-hydroxy-2,2,6,6-tetramethyl-1-piperidine ethanol; and polymethyl(propyl-3-oxy-(2',2',6',6'-tetramethyl-4'-piperidinyl)siloxane.

Preferred stabilizers of the invention are tetrakis(methylene(3,5-di-tert-butyl-4-hydroxy-hydrocinnamate))methane, N,N'-hexamethylenebis(3,5-di-tert-butyl-4-hydroxyhydrocinnamamide) and 1,1,3-tris(2'-methyl-4'-hydroxy-5'-t-butylphenyl)butane, 1,3,5-tris(4-tert-butyl-3-hydroxy-2,6-dimethyl benzyl)-1,3,5-triazine-2,4,6-(1H,3H,5H)-trione, and dilauryl-3,3'-thiodipropionate.

Non-limiting specific examples of component (C) include various hindered phenols marketed by Ciba Specialty Chemicals Corporation under the trade name Irganox™:

Irganox™ 1076=octadecyl 3,5-di-tert-butyl-4-hydroxyhydrocinnamate,
Irganox™ 1035=thiodiethylene bis(3,5-di-tert-butyl-4-hydroxyhydrocinnamate),
Irganox™ MD1024=1,2-bis(3,5-di-tert-butyl-4-hydroxyhydrocinnamoyl)hydrazine,
Irganox™ 1330=1,3,5-trimethyl-2,4,6-tris(3,5-di-tert-butyl-4-hydroxybenzyl)benzene,
Irganox™ 1425 WL=calcium bis(monoethyl(3,5-di-tert-butyl-4-hydroxybenzyl)phosphonate) and
Irganox™ 3114=1,3,5-tris-(3,5-di-tert-butyl-4-hydroxybenzyl)-1,3,5-triazine-2,4,6(1H,3H,5H)-trione.

Preferred hindered phenols are Irganox™ 245 {triethyleneglycol bis(3-(3'-tert-butyl-4'-hydroxy-5'-methylphenyl)propionate)}, Irganox™ 1098 {N,N'-hexamethylenebis(3,5-di-tert-butyl-4-hydroxyhydrocinnamamide)} and Irganox™ 1010 {tetrakis(methylene(3,5-di-tert-butyl-4-hydroxyhydrocinnamate))methane }.

From 0.01 to 5 parts by weight of stabilizer (C) are preferably employed for each 100 parts by weight of polyamide (A) plus silicone base (B). Preferably 0.1 to 0.75 parts by weight, more preferably 0.475 to 0.525 parts by weight, of (C) are added for each 100 parts by weight of (A) plus (B).

The organohydrido silicon compound (D) is a crosslinker (cure agent) for diorganopolysiloxane (B') of present composition and is an organopolysiloxane which contains at least 2 silicon-bonded hydrogen atoms in each molecule, but having at least about 0.1 weight percent hydrogen, preferably 0.2 to 2 and most preferably 0.5 to 1.7, percent hydrogen bonded to silicon. Those skilled in the art will, of course, appreciate that either component (B') or component (D), or both, must have a functionality greater than 2 if diorganopolysiloxane (B') is to be cured (i.e., the sum of these functionalities must be greater than 4 on average). The position of the silicon-bonded hydrogen in component (D) is not critical, and it may be bonded at the molecular chain terminals, in non-terminal positions along the molecular chain or at both positions. The silicon-bonded organic groups of component (D) are independently selected from any of the hydrocarbon or halogenated hydrocarbon groups described above in connection with diorganopolysiloxane (B'), including preferred embodiments thereof. The molecular structure of component (D) is also not critical and is exemplified by straight-chain, partially branched straight-chain, branched, cyclic and network structures, linear polymers or copolymers being preferred, this component should be compatible with diorganopolysiloxane (B') (i.e., it is effective in curing component (B')).

Component (D) is exemplified by the following:
low molecular siloxanes, such as $PhSi(OSiMe_2H)_3$;
trimethylsiloxy-endblocked methylhydridopolysiloxanes;
trimethylsiloxy-endblocked dimethylsiloxane-methylhydridosiloxane copolymers;
dimethylhydridosiloxy-endblocked dimethylapolysiloxanes;
dimethylhydrogensiloxy-endblocked methydrogenpolysiloxanes;
dimethylhydridosiloxy-endblocked dimethylsiloxane-methylhydridosiloxane copolymers;
cyclic methylhydrogenpolysiloxanes;
cyclic dimethylsiloxane-methylhydridosiloxane copolymers;
tetrakis(dimethylhydrogensiloxy)silane;
silicone resins composed of $(CH_3)_2HSiO_{1/2}$, $(CH_3)_3SiO_{1/2}$, and $SiO_{4/2}$ units; and
silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units,
wherein Me and Ph hereinafter denote methyl and phenyl groups, respectively.

Particularly preferred organohydrido silicon compounds are polymers or copolymers comprising RHSiO units ended with either $R_3SiO_{1/2}$ or $HR_2SiO_{1/2}$, wherein R is independently selected from alkyl groups having 1 to 20 carbon atoms, phenyl or trifluoropropyl, preferably methyl. It is also preferred that the viscosity of component (D) is about 0.5 to 1,000 mPa-s at 25° C., preferably 2 to 500 mPa-s. Further, this component preferably has 0.5 to 1.7 weight percent hydrogen bonded to silicon. It is highly preferred that component (D) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. It is understood that such a highly preferred system will have terminal groups selected from trimethylsiloxy or dimethylhdridosiloxy groups.

Component (D) may also be a combination of two or more of the above described systems. The organohydrido silicon compound (D) is used at a level such that the molar ratio of SiH therein to Si-alkenyl in component (B') is greater than 1 and preferably below about 50, more preferably 3 to 30, most preferably 4 to 20.

These SiH-functional materials are well known in the art and many of them are commercially available.

Hydrosilation catalyst (E) is a catalyst that accelerates the cure of diorganopolysiloxane (B') in the present composition. This hydrosilation catalyst is exemplified by platinum catalysts, such as, platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al. , these patents being hereby incorporated by reference. Most preferably, catalyst (E) is a neutralized complex of platinous chloride and divinyltetramethyldisiloxane.

Component (E) is added to the present composition in a catalytic quantity sufficient to promote the reaction of components (B') and (D) and thereby cure the diorganopolysifoxane to form an elastomer. The catalyst is typically added so as to provide about 0.1 to 500 parts per million (ppm) of metal atoms based on the total weight of the thermoplastic elastomer composition, preferably 0.25 to 100 ppm.

In addition to the above mentioned major components (A) through (E), a minor amount (i.e., less than about 40 weight percent of the total composition, preferably less than 20 weight percent) of an optional additive (F) can be incorporated in the compositions of the present invention. This optional additive can be illustrated by, but not limited to, reinforcing fillers for polyamide resins, such as glass fibers and carbon fibers; extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, antioxidants, flame retardants such as halogenated hydrocarbons, alumina trihydrate, magnesium hydroxide, organophosphorous compounds and other fire retardant (FR) materials. A preferred FR additive is calcium silicate particulate, preferably a wollastonite having an average particle size of 2 to 30 $\mu$m. Further, this optional component can be a plasticizers for the silicone gum component, such as polydimethylsiloxane oil, and/or a plasticizer for the polyamide component. Examples of the latter include phthalate esters such as dicyclohexyl phthalate, dimethyl phthalate, dioctyl phthalate, butyl benzyl phthalate and benzyl phthalate; trimellitate esters such as $C_1$–$C_9$ alkyl trimellitate; sulfonamides such as N-cyclohexyl-p-toluenesulfonamide, N-ethyl-o,p-toluenesulfonamide and o-toluenesulfonamide, and liquid oligomeric plasticizers. Preferred plasticizers are liquids with low volatility to avoid emissions of plasticizer at the common melt temperatures of polyamides.

The above additives are typically added to the final thermoplastic composition after dynamic cure, but they may also be added at any point in the preparation provided they do not interfere with the dynamic vulcanization mechanism. Of course, the above additional ingredients are only used at levels which do not significantly detract from the desired properties of the final composition.

According to the method of the present invention, the thermoplastic elastomer is prepared by thoroughly dispersing silicone base (B) and stabilizer (C) in polyamide (A) and dynamically vulcanizing the diorganopolysiloxane using organohydrido silicon compound (D) and catalyst (E). For the purposes of the present invention, the weight ratio of silicone base (B) to polyamide resin (A) is greater than 35:65. It has been found that when this ratio is 35:65 or less, the resulting vulcanizate generally has a modulus more resembling the polyamide resin than a thermoplastic elastomer. On the other hand, the above mentioned ratio should be no more than about 85:15 since the compositions tend to be weak and resemble cured silicone elastomers above this value. Notwithstanding this upper limit, the maximum ratio of (B) to (A) for any given combination of components is also limited by processability considerations since too high a silicone base content results in at least a partially crosslinked continuous phase which is no longer thermoplastic. For the purposes of the present invention, this practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Such a preferred thermoplastic elastomer which is subsequently re-processed generally has a tensile strength and elongation which are within 10% of the corresponding values for the original TPSiV (i.e., the thermoplastic elastomer is little changed by re-processing). Although the amount of silicone base consistent with the above mentioned requirements depends upon the particular polyamide resin and other components selected, it is preferred that the weight ratio of components (B) to (A) is 40:60 to 75:25, more preferably 40:60 to 70:30.

Mixing is carried out in any device which is capable of uniformly dispersing the components in the polyamide resin, such as an internal mixer or a twin-screw extruder, the latter being preferred for commercial preparations. The temperature is preferably kept as low as practical consistent with good mixing so as not to degrade the resin. Depending upon the particular system, order of mixing is generally not critical and, for example, components (A), (C) and (D) can be added to (B) at a temperature above the softening point (melt point) of (A), catalyst (E) then being introduced to initiate dynamic vulcanization. However, components (B) through (D) should be well dispersed in resin (A) before dynamic vulcanization begins. As previously mentioned, it is also contemplated that the silicone base can be formed in-situ. For example, the reinforcing filler may be added to a mixer already containing the polyamide resin and diorganopolysiloxane gum at a temperature below the softening point (melt point) of the resin to thoroughly disperse the filler in the gum. The temperature is then raised to melt the resin, the other ingredients are added and mixing/dynamic vulcanization are carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere (i.e., one that does not adversely react with the components or otherwise interfere with the hydrosilation cure), such as dry nitrogen, helium or argon. It has been observed that there is actually a preferred dry gas flow rate with respect to mechanical properties of the final TPSiV as well as the melt viscosity thereof (see examples, infra).

When the melting point or glass temperature of the polyamide is considerably higher than room temperature (e.g., greater than 100° C.), a preferred procedure comprises preparing a pre-mix by blending dried polyamide resin (A), silicone base (B), stabilizer (C) and organohydrido silicon compound (D) below the melting point/glass temperature of the resin (e.g., at ambient conditions). This pre-mix is then melted in a bowl mixer or internal mixer using a dry inert gas purge and at a controlled temperature which is just above the melt point to about 35° C. above the melt point of the polyamide (e.g., 210° C. to 215° C. for nylon 12 which, depending on molecular weight, has a melt point of about 175° C. –180° C.) and catalyst (E) is mixed therewith. Mixing is continued until the melt viscosity (mixing torque) reaches a steady state value, thereby indicating that dynamic vulcanization of the diorganopolysiloxane of component (B) is complete.

As noted above, in order to be within the scope of the present invention, the tensile strength or elongation, or both, of the TPSiVs must be at least 25% greater than that of a corresponding simple blend. A further requirement of the invention is that the TPSiV has at least 25% elongation, as determined by the test described infra. In this context, the term "simple blend" denotes a composition wherein the weight proportions of resin (A), base (B) and stabilizer (C) are identical to the proportions in the TPSiV, but no cure agents are employed (i.e., either component (D) or (E), or both, are omitted and the gum is therefore not cured). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. At least three such samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such TPSiVs are not within the scope of the present invention.

The thermoplastic elastomer prepared by the above method can then be processed by conventional techniques, such as extrusion, vacuum forming, injection molding, blow molding, overmolding or compression molding. Moreover, these compositions can be re-processed (recycled) with little or no degradation of mechanical properties.

The novel thermoplastic elastomers of the present invention can be used for fabricating wire and cable insulation, electrical connectors, automotive and appliance components such as belts, hoses, air ducts, boots, bellows, gaskets and fuel line components, architectural seals, bottle closures, medical devises, sporting goods and general rubber parts.

EXAMPLES

The following examples are presented to further illustrate the compositions and method of this invention, but are not to be construed as limiting the invention, which is delineated in the appended claims. All parts and percentages in the examples are on a weight basis and all measurements were obtained at 25° C., unless indicated to the contrary.

Materials

The following materials, listed alphabetically for ease of reference, were employed in the examples.

BASE 1 is a silicone rubber base made from 68.7% PDMS 1, defined infra, 25.8% of a fumed silica having a surface area of about 250 $m^2$/g (Cab-O-Sil® MS-75 by Cabot Corp., Tuscola, Ill.), 5.4% of a hydroxy-terminated diorganopolysiloxane having an average degree of polymerization (DP) of about 8 and 0.02% of ammonia.

BASE 2 is a silicone rubber base made from 76.6% PDMS 1, defined infra, 17.6% of a fumed silica having a surface area of about 250 $m^2$/g, 5.7% of a hydroxy-terminated diorganopolysiloxane having an average degree of polymerization (DP) of about 8 and 0.02% of ammonia.

BASE 3 is similar to BASE 1 wherein only 5% of fumed silica is present.

CATALYST 1 is a 1.5% platinum complex of 1,3-diethenyl-1,1,3,3-tetramethyldisiloxane; 6.0% tetramethyldivinyldisiloxane; 92% dimethylvinyl ended polydimethylsiloxane and 0.5% dimethylcyclopolysiloxanes having 6 or greater dimethylsiloxane units.

CYANOX 1790 is a hindered phenol stabilizer marketed by Cytec Industries, West Paterson, N.J., and described as 1,3,5-tris(4-tert-butyl-3-hydroxy-2,6-dimethyl benzyl)-1,3,5-triazine-2,4,6-(1H,3H,5H)-trione.

CYANOX LTDP is a thioester stabilizer marketed by Cytec Industries, West Paterson, N.J., and described as dilauryl-3,3'-thiodipropionate.

IRGANOX™ 245 is a hindered phenol marketed by Ciba Specialty Chemicals Corporation, Tarrytown, N.Y., and described as triethyleneglycol bis {3-(3'-tert-butyl-4'-hydroxy-5'-methylphenyl)propionate }, IRGANOX™ 1010 is a hindered phenol stabilizer marketed by Ciba Specialty Chemicals Corporation and described as tetrakis{methylene(3,5-di-tert-butyl-4-hydroxy-hydrocinnamate)}methane.

IRGANOX™1098 is a hindered phenol described as N,N'-hexamethylene-bis(3,5-di-tert-butyl-4-hydroxyhydrocinnamamide) and marketed by Ciba Specialty Chemicals Corporation.

LOWINOX CA22 is a hindered phenol stabilizer marketed by Great Lakes Chemical Corporation, Indianapolis, Ind., and described as 1,1,3-tris(2'-methyl-4'-hydroxy-5'-t-butylphenyl)butane.

NYLON 11 is nylon 11 obtained from Aldrich Chemical Co., Milwaukee, Wis.; m.p.=198° C.

NYLON 12-A is nylon 12 obtained from Aldrich Chemical Co.; m.p. =178° C.

NYLON 12-B is Rilsan™ AMNO, a nylon 12 marketed by Elf Atochem NA, Inc., Philadelphia, Pa.; m.p.=175° C.

NYLON 4/6 is nylon 4/6 obtained from Aldrich Chemical Co.; m.p.=295° C.

NYLON 6 is nylon 6 obtained from Aldrich Chemical Co. m p.=228.5° C.

NYLON 6/6-A is Zytel™ E42 A NC 010 nylon 6/6 obtained from DuPont; m.p.=262° C.

NYLON 6/6-B is nylon 6/6 obtained from Aldrich Chemical Co.; m.p.=267° C.

NYLON 6/6-C is nylon 6/6 marketed by Solutia, Inc. (St. Louis, Mo.) under the tradename Vydyne™ 66B; m.p.= 260° C.

NYLON 6-D is a nylon 6 marketed under the trade name Zytel™ 7301 by Du Pont; m.p. 215–225° C.

NYLON 6/12 is nylon 6/12 obtained from Aldrich Chemical Co.; m.p.=218° C.

PDMS 1 is a gum consisting of 99.81 wt. % $Me_2SiO$ units, 0.16% MeViSiO units and 0.03% $Me_2ViSiO_{1/2}$ units, wherein Vi hereinafter represents a vinyl group. Prepared by potassium catalyzed equilibration of cyclic siloxanes wherein the catalyst is neutralized with carbon dioxide. This gum has plasticity of about 150.

PDMS 2 is a gum similar to PDMS 1 but having 99.97 wt % $Me_2SiO$ units, and 0.03% $Me_2ViSiO_{1/2}$ units and plasticity of about 150.

PDMS 3 is a gum similar to PDMS 1 but having 97.70 wt % $Me_2SiO$ units, 2.27% MeViSiO units and 0.03% $Me_2ViSiO_{1/2}$ units and plasticity of about 150.

PDMS 4 is a gum similar to PDMS 1 but having 87.05 wt % $Me_2SiO$ units, 12.76% PhMeSiO units, 0.16% MeViSiO units and 0.03% $Me_2ViSiO_{1/2}$ units and plasticity of about 150.

X-LINKER 1 is an SiH-functional crosslinker consisting essentially of 68.4% MeHSiO units, 28.1% $Me_2SiO$ units and 3.5% $Me_3SiO_{1/2}$ units and has a viscosity of approximately 29 mPa·s. This corresponds to the average formula $MD_{16}D'_{39}M$, in which (hereinafter) M is $(CH_3)_3Si$—O—, D is —$Si(CH_3)_2$—O— and D' is —$Si(H)(CH_3)$—O—.

X-LINKER 2 is a fluid similar to X-LINKER 1 having the average formula $MD_{61}D'_8M$.

X-LINKER 3 is a fluid similar to X-LINKER 1 having the average formula $MD_{108}D'_{10}M$.

X-LINKER 4 is a fluid similar to X-LINKER 1 having the average formula $MD_{169}D'_{23}M$ X-LINKER 5 is a fluid similar to X-LINKER 1 having the average formula $MD'_{65}M$.

X-LINKER 6 is a fluid similar to X-LINKER 1 containing about 68% D' units and having a viscosity of approximately 100 mPa-s.

Examples A1–A17

NYLON 12-A (80.0 g) was dried at 120° C. for two hours in a desiccating oven (i.e., a drying system in which hot air is dried over a desiccant bed and then passed through a heated oven containing the sample to be dried in a continuous flow cycle). This resin was then melted at 210° C. at 60 rpm in a Haake System 9000™ miniaturized internal mixer (310 ml bowl) under a dry nitrogen atmosphere using roller rotors. IRGANO™ 1010 (0.24 g) was added and mixed for approximately 3.5 minutes and then BASE 1 (120.0 g) was mixed in. After about 3 minutes, X-LINKER 1 (3.8 g) was added, at which point the mixer torque was approximately 1,800 m-g. After another 3.5 minutes, CATALYST 1 (57 drops=0.855 g) was added and the torque started to rise sharply. After seven additional minutes, the torque increased to 16,400 m-g, mixing was stopped and the resulting nylon TPSiV sample was removed from the bowl.

A sample of the above material was compression molded at 225° C. for 5 minutes under approximately 10 ton pressure (99 KPa) in a stainless steel Endura™ 310-2 Coated mold followed by cold pressing for 3 minutes. The tensile properties were measured on dumbbells having a length of 25.4 mm, width of 3.18 mm and a thickness of 1 to 2 mm, according to ASTM method D 412 at 23° C. and an extension rate 50 mm/min. At least 3 samples were tested, the results being averaged and presented in Table A1 (Example A1). For comparison purposes, a simple physical blend (PB) having the same ratio of NYLON 12-A and BASE 1 which did not contain crosslinker or catalyst was prepared. The poor mechanical properties of this physical blend, also shown in Table A1, illustrate the advantage of dynamic vulcanization (Comparative Example A2).

TPSiVs and physical blends based on various nylons at two different levels of hindered phenol were prepared according to the methods of Example A1, the respective mechanical properties again being presented in Table A1. Each such resin was processed at the temperature indicated in the fourth column, as necessitated by the different melting points. Mixing was stopped after torque had stabilized at the value reported and samples were molded at a temperature commensurate with the melt point of the particular nylon.

TABLE A1

| Example | IRGANOX™ 1010 Content (g) | Nylon Type | Set Process Temp. (° C.) | Tensile (MPa) | Elongation (%) | Torque (m-g) |
|---|---|---|---|---|---|---|
| Ex. A1 | 0.24 | 12 | 210 | 12.5 | 134 | 16,400 |
| Comp. Ex. A2 (PB) | 0.24 | 12 | 210 | 3.1 | 22 | 1,700 |
| Ex. A3 | 1 | 12 | 210 | 14.9 | 200 | 15,000 |
| Comp. Ex. A4 | 0.24 | 11 | 215 | 6.44 | 17 | 12,000 |
| Comp. Ex. A5 | 0.24 | 6/12 | 240 | 8.0 | 19 | 4,200 |
| Comp. Ex. A6 (PB) | 1 | 6/12 | 240 | 1.92 | 7 | 1,000 |
| Ex. A7 | 1 | 6/12 | 240 | 15.8 | 141 | 3,900 |
| Ex. A8 | 1 | 6 | 245 | 11.0 | 99 | 5,200 |
| Ex. A9* | 1 | 6 | 245 | 10.3 | 76 | 4,000 |
| Ex. A10* | 0.24 | 6 | 245 | 12.7 | 84 | 5,000 |
| Ex. A11 | 0.24 | 6 | 245 | 7.74 | 39 | 8,000 |
| Comp. Ex. A12 (PB) | 0.24 | 6 | 245 | 1.63 | 6 | 1,000 |
| Comp. Ex. A13 | 0.24 | 6/6-B | 275 | 8.8 | 22 | 4,000 |
| Comp. Ex. A14 | 1.0 | 6/6-A | 275 | 2.2 | 4 | 7,800 |

TABLE A1-continued

| Example | IRGANOX ™ 1010 Content (g) | Nylon Type | Set Process Temp. (° C.) | Tensile (MPa) | Elongation (%) | Torque (m-g) |
|---|---|---|---|---|---|---|
| Comp. Ex. A15 (PB) | 0 | 6/6-B | 285 | 1.25 | 6 | 1,200 |
| Comp. Ex. A16 | 1 | 4/6 | 300 | 5.49 | 10 | 3,800 |
| Comp. Ex. A17 (PB) | 0 | 4/6 | 300 | 1.3 | 4 | 800 |

(PB) = Physical blend (no crosslinking)
*X-LINKER 6 used instead of X-LINKER 1 at same level.

As can be seen from a comparison of Examples A1 and A3, increasing the hindered phenol content resulted in improved physical properties. Further, formulations based on NYLON 11 did not result in a product having sufficient elongation, this polyamide exhibiting unstable rheology under these conditions. Likewise, NYLON 4/6 has a melt point above 275° C. and, again, resulted in poor mechanical properties even at a higher hindered phenol content.

Examples A18–A21

TPSiVs based on NYLON 12-A were prepared according to the methods of Example A1 wherein the total amount of BASE 1 and NYLON 12-A was maintained at 200 g but the ratio of these two components, as well as IRGANOX™ 1010 content, were varied, as shown in Table A2. The X-LINKER 1 amount was also adjusted to maintain a constant SiH/Vi ratio. The respective mechanical properties are also presented in this table.

TABLE A2

| Example | IRGANOX ™ 1010 Content (g) | Ratio of BASE 1 to NYLON 12-A | Tensile (MPa) | Elong-ation (%) | Torque (m-g) |
|---|---|---|---|---|---|
| Ex. A18 | 0.18 | 70/30 | 3.14 | 28 | 13,000 |
| Comp. Ex. A19 | 0.15 | 75/25 | 1.1 | 14 | 12,200 |
| Ex. A20 | 0.12 | 80/20 | 2.85 | 64 | 10,000 |
| Ex. A21 | 0.09 | 85/15 | 3.35 | 116 | 9,000 |

Examples A22–A32

The above experiments were repeated using an IRGANOX™ 1010 content of 1 g in otherwise similar formulations wherein the ratio of base to NYLON 12-A was varied, the results being shown in Table A3

TABLE A3

| Example | IRGANOX ™ 1010 Content (g) | Ratio of BASE 1 to NYLON 12-A | Tensile (MPa) | Elong-ation (%) | Torque (m-g) |
|---|---|---|---|---|---|
| Ex. A22 | 1 | 60/40 | 14.9 | 200 | 15,000 |
| Comp. Ex. A23 (PB) | 1 | 60/40 | 2.16 | 15 | 1,500 |
| Ex. A24 | 1 | 65/35 | 15.7 | 243 | >19,000 |
| Comp. Ex. A25 (PB) | 1 | 70/30 | 0.63 | 23 | 1,800 |
| Ex. A26 | 1 | 70/30 | 11.5 | 119 | 12,000 |
| Comp. Ex. A27 (PB) | 1 | 75/25 | * | * | 2,000 |
| Ex. A28 | 1 | 75/25 | 7.94 | 145 | 14,000 |
| Comp. Ex. A29 (PB) | 1 | 80/20 | * | * | 2,200 |
| Ex. A30 | 1 | 80/20 | 8.99 | 229 | 11,000 |
| Comp. Ex. A31 (PB) | 1 | 85/15 | * | * | 2,500 |
| Ex. A32** | 1 | 85/15 | 7.14 | 245 | 11,000 |

(PB) = Physical blend (no crosslinking)
* material too weak to measure tensile properties
**order of addition during mixing was: BASE 1, NYLON 12-A, IRGANOX ™ 1010 and X-LINKER 1 followed by CATALYST 1.

From Tables A2 and A3 it is again apparent that physical blends wherein the silicone component is not cured do not meet the minimal requirements of elongation for TPSiVs of the present invention. Although the compositions of Examples A30 and A32 could be compression molded, it was observed that these could not be extruded. Thus, as discussed above, such TPSiVs having a weight ratio of base to polyamide greater than about 75:25 are less preferred. Further, this series is illustrative of the type of routine experimentation required to determine the lower limit of hindered phenol required to attain at least a 25% elongation for a given system.

Examples A33–A38

TPSiVs based on dried NYLON 12-A were prepared according to the methods of Example A1 wherein the effects of drying the nylon resin, use of a purge and inclusion of IRGANOX™ 1010 were evaluated. In this series of experiments, the proportions of the components and bowl filling factor (i.e., the percent of bowl free-volume occupied by the ingredients) were maintained as in Example A1 but mixing was carried out in a 60 ml miniaturized internal mixer so that reported torque values are not to be compared with those obtained with the 310 ml bowl. The results are presented in Table A4, wherein the second column indicates whether drying of the nylon (120° C./2 hr) was employed, whether dry nitrogen was applied and whether IRGANOX™ 1010 (0.24 parts per 200 parts of NYLON 12-A+ BASE 1) was included (indicated by + in each case) and when not (indicated by − in each case).

TABLE A4

| Example | Drying/Nitrogen/IRGANOX™ 1010 | Tensile (MPa) | Elongation (%) | Torque (m-g) |
|---|---|---|---|---|
| Comp. Ex. A33 | −/−/+ | 5.0 | 21 | 550 |
| Ex. A34 | +/−/+ | 6.67 | 35 | 550 |
| Ex. A35 | +/+/+ | 13.6 | 115 | >3,150 |
| Comp. Ex. A36 | −/−/− | 4.96 | 15 | 650 |
| Comp. Ex. A37 | −/+/− | 5.77 | 19 | 3,200 |
| Comp. Ex. A38 | −/+/+ | 2.58 | 14 | 1,200 |

It is clear from Table A4 that the combination of drying, dry nitrogen purge and inclusion of IRGANOX™ 1010 provides the best mechanical properties.

Examples A39–A43

TPSiVs based on dried NYLON 12-B were prepared according to the methods of Example A1 wherein the flow rate of dry nitrogen to the mixer was varied. The results are shown in Table A5, wherein the flow rate is reported in $m^3/min$.

TABLE A5

| Example | Nitrogen Flow ($m^3$/min) | Tensile (MPa) | Elongation (%) | Torque (m-g) |
|---|---|---|---|---|
| Ex. A39 | 0.028 | 13.6 | 180 | >20,000 |
| Ex. A40 | 0.014 | 14.6 | 217 | 11,000 |
| Ex. A41 | 0.0071 | 16.2 | 274 | 11,000 |
| Ex. A42 | 0.0028 | 15.6 | 233 | 15,800 |
| Ex. A43 | 0 | 9.57 | 70 | 1,800 |

It can be seen that the sample prepared without the nitrogen purge (Example A43) had relatively poor mechanical properties, although within the requirements of the invention. Additionally, there is an apparent optimum nitrogen flow rate with respect to good mechanical properties and low process viscosity (i.e., low torque).

Examples A44–A51

NYLON 6/6-B (80.0 g) was dried at 120° C. for two hours in a desiccating oven (i.e., hot air is dried over a desiccant bed and then passed through a heated oven containing the sample in a continuous flow cycle). The resin was melted at 275° C. at 60 rpm in a Haake System 9000™ miniaturized internal mixer (310 ml bowl) under a dry nitrogen atmosphere using roller rotors. BASE 1 (120.0 g) was added 4 minutes after addition of polyamide. IRGANOX™ 1010 (1.0 gram) was added 2.5 minutes later and mixed for approximately 2.5 minutes. X-LINKER 1 (3.8 g) was added, at which point the mixer torque was approximately 1,100 m-g. After another 3.5 minutes, CATALYST 1 (57 drops= 0.855 g) was added and the torque started to rise. After 18 additional minutes, the torque increased to 5,800 m-g , mixing was stopped and the resulting nylon TPSiV sample was removed from the bowl. The resulting TPSiV was molded at 285° C. and tested, as described above, the results being shown in Table A6 (Example A44).

Similar compositions were prepared using NYLON 6/6-A and NYLON 6/6-C, these results also being presented in Table A6. In these examples the order of mixing was varied, as shown in the second column of Table A6, wherein N, Irg. and Base denote the nylon, IRGANOX™ 1010 and BASE 1, respectively.

TABLE A6

| Example | Order of addition | Torque (m-g) | Nylon Type | Tensile (MPa) | Elongation (%) |
|---|---|---|---|---|---|
| Ex. A44 | N/Base/Irg. | 5,800 | NYLON 6/6-B | 14.6 | 81 |
| (Comp.) Ex. A45 | N/Irg./Base | 8,000 | NYLON 6/6-A | 5.57 | 10 |
| A46 | Base/Irg./N | 10,200 | NYLON 6/6-A | 8.70 | 26 |
| (Comp.) Ex. A47 | Base/N/Irg. | 7,300 | NYLON 6/6-A | 5.41 | 9 |
| Ex. A48 | N/Irg./Base | 8,400 | NYLON 6/6-C | 9.33 | 33 |
| (Comp.) Ex. A49 | Base/Irg/N | 10,600 | NYLON 6/6-C | 7.66 | 23 |
| (Comp.) Ex. A50 | N/Base/Irg. | 9,800 | NYLON 6/6-C | 7.45 | 16 |
| (Comp.) Ex. A51 | Base/N/Irg. | 15,000 | NYLON 6/6-C | 6.86 | 14 |

Table A6 illustrates our observation that it is more difficult to prepare TPSiVs having high tensile/elongation properties as the melting point of the polyamide approaches 275° C. Nevertheless, routine experimentation does provide compositions within the scope of the present invention.

Example B1

NYLON 12-B was dried at 120° C. for 18 hours in a desiccating oven, as described above in Example A1. A pre-mix of this dried polyamide was prepared by blending the following components in a Haake Rheomix™ 3000 mounted on a PolyLab™ miniaturized internal mixer using sigma blade rotors (free volume=541 $cm^3$):

| | |
|---|---|
| 210.4 g | BASE 1 |
| 6.60 g | X-LINKER 1 |
| 1.75 g | IRGANOX ™ 1010 |
| 140.0 g | NYLON 12-B |

Blending was carried out at 20° C. and a rotor speed of 60 rpm, until a stable torque reading was observed. The resulting pre-mix (210.8 g) was fed to a Rheomix™ 3000 bowl fitted with roller rotors (free volume=310 $cm^3$) at 210° C., 60 rpm using a dry nitrogen purge at a flow rate of 0.5 standard cubic feet per minute (236 $cm^3$/s). As previously noted, mixing torques observed in this series should not be compared with those obtained using the above described Haake System 9000™ mixer. The set temperature was reduced to 200° C. and when the mixing torque began to level out, indicating that the nylon had melted and the pre-mix had reached the set temperature, 57 drops (0.912 g) of CATALYST 1 were added. When the torque again reached a steady state value (5,800 m-g), the resulting TPSiV was removed.

The above product was compression molded at 225° C. for 5 minutes and exhibited a tensile strength of 2631 psi (18.1 MPa) and an elongation of 298% according to ASTM method D 412, as described in Example A1 with the exception that at least 5 tensile measurements were averaged.

Examples B2–B5

The procedures of Example B1 were followed wherein NYLON 12-A served as the polyamide resin and the type of hindered phenol was varied. In each case, 120.0 g of the polyamide, 80.0 g of BASE 1 and 3.8 g of X-LINKER 1 were pre-mixed using sigma blades. This premix was dynamically cured by adding 1 g of the hindered phenol indicated in Table B1 and 0.912 g of CATALYST 1. This table also shows the respective mechanical properties of molded test specimens.

TABLE B1

| Example | Hindered Phenol | Terminal Torque (m-g) | Ultimate Tensile Strength (MPa) | Elongation at Break (%) |
|---|---|---|---|---|
| Ex. B2 | IRGANOX ™ 1010 | 7,150 | 16.2 | 251 |
| Ex. B3 | IRGANOX ™ 245 | 9,090 | 16.3 | 237 |
| Ex. B4 | IRGANOX ™ 1098 | 10,000 | 13.2 | 151 |
| Comp. Ex. B5 | none | 10,000 | 12.2 | 134 |

It can be seen from Table B1 that omitting the hindered phenol reduces ultimate mechanical properties.

Example C1–C4

Nylon TPSiVs were prepared according to the methods of Example B1 wherein different siloxane gums having various vinyl contents were used. In each case, the respective gum shown in Table C1 was used in place of PDMS 1 in the formulation of BASE 1 to prepare a similar silicone base, the latter then being used in the following proportions to provide the final TPSiV:

| | |
|---|---|
| NYLON 12-A | 80 g |
| IRGANOX ™ 1010 | 1 g |
| SILICONE BASE | 120 g |
| X-LINKER 1 | 3.8 g |
| CATALYST 1 | 0.86 g |

TABLE C1

| Example | Gum | Vinyl Content of Gum (wt %) | Tensile (MPa) | Elongation (%) | Torque (m-g) |
|---|---|---|---|---|---|
| Ex. C1 | PDMS 2 | 0.012 | 10.9 | 100 | 12,000 |
| Ex. C2 | PDMS 1 | 0.0652 | 13.7 | 170 | 22,000 |
| Ex. C3 | PDMS 3 | 0.753 | 10.8 | 39 | 6,000 |
| Ex. C4 | PDMS 4 | 0.0596 | 14.5 | 193 | 15,000 |

Examples C5–C7

Nylon TPSiVs were prepared according to the methods of Example C1 wherein different silicone bases having various levels of silica filler were used. In each case, the respective base shown in Table C2 was used in the following formulation to provide the final TPSiV:

| | |
|---|---|
| NYLON 12-A | 80 g |
| IRGANOX ™ 1010 | 1 g |
| SILICONE BASE | 120 g |
| X-LINKER 1 | 3.0 g |
| CATALYST 1 | 0.86 g |

TABLE C2

| Example | Silicone Base | Tensile (MPa) | Elongation (%) | Torque (m-g) |
|---|---|---|---|---|
| Ex. C5 | BASE 1 | 13.5 | 160 | 17,500 |
| Ex. C6 | BASE 2 | 10.9 | 107 | 11,000 |
| Ex. C7 | BASE 3 | 4.11 | 30 | 1,800 |

An attempt was made to prepare a TPSiV according to the methods of Examples C5-C7 wherein the silicone component did not contain fumed silica (i.e., only PDMS 1 gum) but the resulting composition was too weak to test.

Example C8–C12

Nylon TPSiVs were prepared according to the methods of Example C1 wherein different SiH-functional crosslinkers were used at a constant SiH SiVi ratio. The type and amount of crosslinker employed being shown in the second and third columns of Table C3, respectively.

TABLE C3

| Example | Crosslinker Type | Crosslinker Amount (g) | Tensile (MPa) | Elongation (%) | Torque (m-g) |
|---|---|---|---|---|---|
| Ex. C8 | X-LINKER 1 | 1.0 | 7.97 | 81 | 4,600 |
| Ex. C9 | X-LINKER 2 | 7.1 | 5.23 | 47 | 5,100 |
| Ex. C10 | X-LINKER 3 | 9.1 | 5.75 | 56 | 5,300 |
| Ex. C11 | X-LINKER 4 | 6.4 | 5.22 | 38 | 5,600 |
| Comp. Ex. C12 | X-LINKER 5 | 0.66 | 3.15 | 15 | 4,400 |

From Table C3 it is seen that X-LINKER 1 provides the best overall mechanical properties while X-LINKER 5 does not meet the requirements of the invention under the conditions of this series of experiments.

Example D1

Comparative Example

BASE 1 (120.03 g) was added to a Haake Polylab #1 with roller rotors, at a set temperature of 240° C. with cooling throughout, rotor speed of 60 rpm and a nitrogen purge. At 0.5 minutes, 80.0 g of dried (4 hrs/80° C.) Nylon 6-D was added to the mixer and allowed to melt and mix for an additional 2 minutes. At 2.5 minutes, 3.812 g of X-LINKER 1 was added to the bowl and mixing continued for an additional 3 minutes under 12 ton then the sample was pulled from the mixer. The sample was initially pressed for 3–10 minutes in a Carver Bench Press under 5 ton pressure (49.5 KPa) at room temperature. The above material was then compression molded at 250° C. for 3 minutes under 12 ton pressure with a two minute pre-heat, followed by a two minute cold pressing. The tensile properties of the material were measured on dumbbells having a bridge length of 33 mm, width of 0.1250 inches (0.3175 cm) and a typical thickness of 1.5 to 2 mm, following ASTM method D412 at an extensional pulling rate of 50 mm/min. The tensile attained was 2.8 MPa with an elongation of 7.9%.

Three specimens were also heat aged at 150° C. for 168 hours in accordance with ASTM D573, but the samples were degraded to a point where they could not be tested.

Fuel Immersion testing was done at 23° C. for 166 hours, following ASTM D471-98, with resulting tensile of 2.1 MPa (21% loss) and 15.2% elongation (92.4% gain)

Example D2

Comparative Example

BASE 1 (119.99 g) was added to a Haake Polylab #1 with roller rotors, at a set temperature of 240° C. with cooling throughout, rotor speed of 60 rpm and a nitrogen purge. At 0.3 minutes, 80.0 g of dried (4 hrs/80° C.) Nylon 6-D was added to the mixer and allowed to melt and mix for an additional 1.5 minutes. At 2.5 minutes, 4.182 g of X-LINKER 1 was added to the bowl and mixing continued for an additional 2 minutes and then the sample was pulled from the mixer. At 4 minutes 2.32 g of a 1:4 (wt. %) mixture of CATALYST 1/1000cst Dow Corning 200® Fluid was added to the mixture. The torque then increased from 1000 mg to 3500 mg in an 11-minute period. The mixer was then stopped and the sample was pulled from the mixer. The sample was evaluated using the procedure described above. The tensile attained was 11.0 MPa with an elongation of 31.7%.

Three specimens were also heat aged at 150° C. for 168 hours in accordance with ASTM D573, with resulting mechanicals of 6.067 MPa (39.9 loss) and 2.72% elongation (91.4% loss).

Fuel Immersion testing was done at 23° C. for 166 hours, following ASTM D471-98, with resulting tensiles of 11.4 MPa (3.6% gain) and 22.7% elongation (28.4% loss)

Example D3

BASE 1 (119.97 g) was added to a Haake Polylab #1 with roller rotors, at a set temperature of 240° C. with cooling throughout, rotor speed of 60 rpm and a nitrogen purge. At 0.8 minutes, 79.98 g of dried (4 hrs/80° C.) Nylon 6-D and 1.0 g of Cyanox 1790 was added to the mixer and allowed to melt and mix for an additional 2.0 minutes. At 2.5 minutes, 3.986 g of X-LINKER 1 was added to the bowl. At 4.8 minutes 2.73 g of a 1:4 (wt. %) mixture of CATALYST 1/1000cst Dow Corning 200® Fluid was added to the mixture. The torque then increased from 1000 mg to 5800 mg in an 11-minute period. The mixer was then stopped and the sample was pulled from the mixer. The sample was evaluated using the procedure described in E1. The tensile attained was 13.5 MPa with an elongation of 88.2%. Three specimens were also heat aged at 150° C. for 168 hours in accordance with ASTM D573, with resulting mechanicals of 11.36 MPa (15.8% loss) and 37.02% elongation (58% loss). Fuel Immersion testing was done at 23° C. for 166 hours, following ASTM D471-98, with resulting tensiles of 11.2 MPa (17.0% gain) and 42.7% elongation (51.6% loss)

Example D4

BASE 1 (210.4 g) was added to a Haake Polylab #1 with roller blades, at a set temperature of 20° C. with cooling throughout, rotor speed of 60 rpm and a nitrogen purge. At 0.9 minutes, 140.0 g of dried (4 hrs/80° C.) Nylon 6-D and 1.75 g of Cyanox 1790 was added to the mixer and allowed to melt and mix for an additional 5.0 minutes. At this time the mixture was taken from the bowl. The Sigma Blades were replaced with roller rotors and the temperature was set at 240° C. Then 201.0 g of the "cold premix" was added to the Haake and allowed to melt and mix. At 3.5 minutes, 3.810 g of X-LINKER 1 was added to the bowl. At 5.4 minutes 2.31 g of a 1:4 (wt. %) mixture of CATALYST 1/1000cst Dow Corning 200® Fluid was added to the mixture. The torque then increased from 1000 mg to 5200 mg in an 5 minute period. The mixer was then stopped and the sample was pulled from the mixer. The sample was evaluated using the procedure described above. The tensile attained was 14.6 MPa with an elongation of 80.1%.

Three specimens were also heat aged at 150° C. for 168 hours in accordance with ASTM D573, with resulting mechanicals of 14.7 MPa (0.7% gain) and 62.4% elongation (22.1% loss). Fuel Immersion testing was done at 23° C. for 166 hours, following ASTM D471-98, with resulting tensiles of 12.4 MPa (15.1% loss) and 54.6% elongation (31.8% loss)

Example D5

BASE 1 (119.99 g) was added to a Haake Polylab #1 with roller rotors, at a set temperature of 240° C. with cooling throughout, rotor speed of 60 rpm and a nitrogen purge. At 0.7 minutes, 80.0 g of dried (4 hrs/80° C.) Nylon 6-D and 1.0 g of Lowinox CA22 was added to the mixer and allowed to melt and mix for an additional 1.5 minutes. At 3.0 minutes, 3.831 g of X-LINKER 1 was added to the bowl. At 4.3 minutes 2.30 g of a 1:4 (wt. %) mixture of CATALYST 1/1000cst Dow Corning 200® Fluid was added to the mixture. The torque then increased from 1000 mg to 3500 mg in an 11-minute period. The mixer was then stopped and the sample was pulled from the mixer. The sample was evaluated using the procedure described above. The tensile attained was 15.62 MPa with an elongation of 86.4%.

Three specimens were also heat aged at 150° C. for 168 hours in accordance with ASTM D573, with resulting mechanicals of 16.6 MPa (6.3% gain) and 91.7% elongation (29.2% loss). Fuel Immersion testing was done at 23° C. for 166 hours, following ASTM D471-98, with resulting tensiles of 15.9 MAPa (1.8% gain) and 86.4% elongation (28.5% loss)

Example D6

BASE 1 (210.4 g) was added to a Haake Polylab #1 with roller blades, at a set temperature of 20° C. with cooling throughout, rotor speed of 60 rpm and a nitrogen purge. At 0.6 minutes, 139.98 g of dried (4 hrs/80° C.) Nylon 6-D and 1.75 g of Lowinox CA22 was added to the mixer and allowed to melt and mix for an additional 5.0 minutes. At this time the mixture was taken from the bowl. The Sigma Blades were replaced with roller rotors and the temperature was set at 240° C. Then 201.5 g of the "cold premix" was added to the Haake and allowed to melt and mix. At 3.3 minutes, 3.797 g of X-LINKER 1 was added to the bowl. At 4.5 minutes 2.30 g of a 1:4 (wt. %) mixture of CATALYST 1/1000cst Dow Corning 200® Fluid was added to the mixture. The torque then increased from 1000 mg to 4000 mg in a 5 minute period. The mixer was then stopped and the sample was pulled from the mixer. The sample was evaluated using the procedure described above. The tensile attained was 15.0 MPa with an elongation of 113%.

Three specimens were also heat aged at 150° C. for 168 hours in accordance with ASTM D573, with resulting mechanicals of 15.5 MPa (3.3 gain) and 72.8% elongation (35.5% loss). Fuel Immersion testing was done at 23° C. for 166 hours, following ASTM D471-98, with resulting tensiles of 14.3 MPa (4.7% loss) and 78.5% elongation (31.7% loss).

Example D7

BASE 1 (119.98 g) was added to a Haake Polylab #1 with roller rotors, at a set temperature of 240° C. with cooling throughout, rotor speed of 60 rpm and a nitrogen purge. At 0.7 minutes, 80.0 g of dried (4 hrs/80° C.) Nylon 6-D and 1.0 g of Cyanox LTDP was added to the mixer and allowed to melt and mix for an additional 2.0 minutes. At 3.0 minutes, 3.87 g of X-LINKER 1 was added to the bowl. At 4.8 minutes 2.29 g of a 1:4 (wt. %) mixture of CATALYST 1/1000cst Dow Corning 200® Fluid was added to the mixture. The torque then increased from 1000 mg to 4900 mg in an 12-minute period. The mixer was then stopped and the sample was pulled from the mixer. The sample was evaluated using the procedure described above. The tensile attained was 14.5 MPa with an elongation of 91.8%.

Three specimens were also heat aged at 150° C. for 168 hours in accordance with ASTM D573, with resulting mechanicals of 5.8 MPa (57.9% loss) and 2.9% elongation (96.8% loss). Fuel Immersion testing was done at 23° C. for 166 hours, following ASTM D471-98, with resulting tensiles of 11.4 MPa (21.4% gain) and 42.2% elongation (54.0% loss)

What is claimed is:

1. A method for preparing a thermoplastic elastomer, said method comprising:
   (I) mixing
       (A) a rheologically stable polyamide resin having a melting point or glass transition temperature of 25° C. to 275° C.,
       (B) a silicone base comprising
           (B') 100 parts by weight of a diorganopolysiloxane gum having a plasticity of at least 30 and having an average of at least 2 alkenyl radicals in its molecule and
           (B") 5 to 200 parts by weight of a reinforcing filler,
       the weight ratio of said silicone base to said polyamide resin is from 35:65 to 85:15,
       (C) 0.01 to 5 parts by weight of a stabilizer per 100 parts by weight of said polyamide resin plus said silicone base, said stabilizer being selected from hindered phenols; thioesters; hindered amines; 2,2'-(1,4-phenylene) bis(4H-3, 1-benzoxazin-4-one); and 3,5-di-tert-butyl-4-hydroxybenzoic acid, hexadecyl ester,
       (D) an organohydrido silicon compound which contains an average of at least 2 silicon-bonded hydrogen groups in its molecule and
       (E) a hydrosilation catalyst, components (D) and (E) being present in an amount sufficient to cure said diorganopolysiloxane (B'); and
   (II) dynamically curing said diorganopolysiloxane (B'), wherein at least one property of the thermoplastic elastomer selected from tensile strength or elongation is at least 25% greater than the respective property for a corresponding simple blend wherein said diorganopolysiloxane is not cured and said thermoplastic elastomer has an elongation of at least 25%.

2. The method according to claim 1, wherein the weight ratio of said silicone base (B) to said polyamide resin (A) is greater from 35:65 to 75:25.

3. The method according to claim 2, wherein said polyamide is selected nylon 6, nylon 6/6, nylon 6/12 and nylon 12.

4. The method according to claim 2, wherein said diorganopolysiloxane (B') is a gum selected from a copolymer consisting essentially of dimethylsiloxane units and methylvinylsiloxane units and a copolymer consisting essentially of dimethylsiloxane units and methylhexenylsiloxane units and said reinforcing filler (B") is a fumed silica.

5. The method according to claim 4, wherein said organohydrido silicon component (D) is selected from a polymer consisting essentially of methylhydridosiloxane units and a copolymer consisting essentially of dimethylsiloxane units and methylhydridosiloxane units, having 0.5 to 1.7 weight percent hydrogen bonded to silicon and having a viscosity of 2 to 500 mPa-s at 25° C. and said catalyst (E) is a neutralized complex of platinous chloride and divinyltetramethyldisiloxane.

6. The method according to claim 3, wherein the weight ratio of said silicone base (B) to said polyamide resin (A) is 40:60 to 70:30.

7. The method according to claim 1, wherein said stabilizer is a hindered phenol having at least one group of the formula

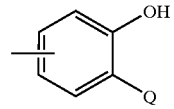

in its molecule, in which Q is a monovalent organic group having 1 to 24 carbon atoms selected from
   (i) hydrocarbon groups,
   (ii) hydrocarbon groups which optionally contain heteroatoms selected from sulfur, nitrogen or oxygen or
   (iii) halogen-substituted versions of (i) or (ii),
wherein the benzene ring of said formula may additionally be substituted with at least one Q group.

8. The method according to claim 7, wherein said stabilizer is a hindered phenol having at least one group of the formula

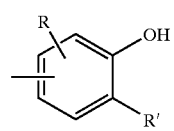

in its molecule, wherein R is an alkyl group having one to four carbon atoms, R' is a hydrocarbon group having 4 to 8 carbon atoms and wherein the benzene ring of said formula may be optionally further substituted with a hydrocarbon group having 1 to 24 carbon atoms.

9. The method according to claim 7, wherein said hindered phenol is selected from tetrakis(methylene(3,5-di-tert-butyl-4-hydroxy-hydrocinnamate))methane, N,N'-hexamethylenebis(3,5-di-tert-butyl-4-hydroxyhydrocinnamamide) and 1,1,3-tris(2'-methyl-4'-hydroxy-5'-t-butylphenyl)butane, 1,3,5-tris(4-tert-butyl-3-hydroxy-2,6-dimethyl benzyl)-1,3,5-triazine-2,4,6-(1H,3H, 5H)-trione, and dilauryl-3,3'-thiodipropionate.

10. The method according to claim 1, wherein said polyamide resin is selected from the group consisting of nylon 6, nylon 6/6, nylon 6/12 and nylon 12.

11. The method according to claim 10, wherein the weight ratio of said silicone base (B) to said polyamide resin (A) is 40:60 to 70:30.

12. The method according to claim 4, wherein said polyamide has a melt point greater than 100° C. and wherein a pre-mix of components (A) through (D) is first prepared at a temperature below the melting point of the polyamide, said catalyst (E) is subsequently added to said pre-mix at a temperature above the melt point and said diorganopolysiloxane (B') is then dynamically vulcanized.

13. A thermoplastic elastomer prepared by the method of claim 1.

14. A thermoplastic elastomer prepared by the method of claim 2.

15. A thermoplastic elastomer prepared by the method of claim 3.

16. A thermoplastic elastomer prepared by the method of claim 4.

17. A thermoplastic elastomer prepared by the method of claim 5.

18. A thermoplastic elastomer prepared by the method of claim 6.

19. A thermoplastic elastomer prepared by the method of claim 7.

20. A thermoplastic elastomer prepared by the method of claim 8.

21. A thermoplastic elastomer prepared by the method of claim 9.

22. A thermoplastic elastomer prepared by the method of claim 10.

23. A thermoplastic elastomer prepared by the method of claim 11.

24. A thermoplastic elastomer prepared by the method of claim 12.

* * * * *